(12) United States Patent
Kim et al.

(10) Patent No.: US 8,811,343 B2
(45) Date of Patent: Aug. 19, 2014

(54) METHOD OF PROVIDING WIRELESS COMMUNICATION BETWEEN VEHICLE AND ROADSIDE AND VEHICLE WIRELESS COMMUNICATION DEVICE USING THE SAME

(75) Inventors: Jung-Sook Kim, Daejeon (KR); Dong-Kyoo Kim, Chungcheongnam-do (KR); Dong-Yong Kwak, Daejeon (KR); Dong-Sun Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 97 days.

(21) Appl. No.: 13/335,905

(22) Filed: Dec. 22, 2011

(65) Prior Publication Data

US 2012/0163275 A1    Jun. 28, 2012

(30) Foreign Application Priority Data

Dec. 22, 2010   (KR) .......................... 10-2010-0132873
May 13, 2011   (KR) .......................... 10-2011-0045367

(51) Int. Cl.
*H04W 4/00*   (2009.01)
*H04W 36/32*   (2009.01)

(52) U.S. Cl.
CPC ................................... *H04W 36/32* (2013.01)
USPC ....................................................... 370/331

(58) Field of Classification Search
CPC .......... H04W 36/0005; H04W 72/042; H04W 74/02; H04W 36/32; H04W 48/08
USPC .......................... 370/314, 329, 331, 332, 443
See application file for complete search history.

(56) References Cited

U.S. PATENT DOCUMENTS

| | | | | |
|---|---|---|---|---|
| 5,982,780 | A * | 11/1999 | Bohm et al. | 370/450 |
| 7,639,657 | B1 * | 12/2009 | Ho et al. | 370/338 |
| 2002/0036571 | A1 * | 3/2002 | Takahashi et al. | 340/901 |
| 2004/0131034 | A1 * | 7/2004 | Sugaya | 370/337 |
| 2006/0215610 | A1 * | 9/2006 | Shinoda | 370/331 |
| 2008/0137599 | A1 * | 6/2008 | Ham et al. | 370/329 |
| 2009/0279499 | A1 * | 11/2009 | Machida | 370/330 |
| 2010/0150118 | A1 * | 6/2010 | Daum | 370/338 |
| 2010/0195601 | A1 * | 8/2010 | Zhang | 370/329 |
| 2011/0063130 | A1 * | 3/2011 | Ozaki et al. | 340/905 |
| 2012/0044827 | A1 * | 2/2012 | In et al. | 370/252 |

FOREIGN PATENT DOCUMENTS

| | | | |
|---|---|---|---|
| KR | 2003-0076002 A | 9/2003 | |
| KR | 2009-0057766 A | 6/2009 | |

* cited by examiner

*Primary Examiner* — Ricky Ngo
*Assistant Examiner* — Kabir Jahangir
(74) *Attorney, Agent, or Firm* — Rabin & Berdo, P.C.

(57) ABSTRACT

Disclosed herein is a method of providing vehicle wireless communication. In the method, a vehicle receives hand-over-related link information, which includes slot request information about slots requested by a vehicle to a roadside wireless communication device for hand-over of the vehicle, from a central control server. A hand-over preparation message, which includes the hand-over-related link information, is send to a vehicle wireless communication device connected to the vehicle. It is determined that the vehicle completed preparation for performance of the hand-over when a response message to the hand-over preparation message is received from the vehicle wireless communication device. Slots are allocated in consideration of the hand-over-related link information. Beacon frames, which include slot allocation information about the allocated slots, are transmitted to the vehicle wireless communication device. Accordingly, the vehicle wireless communication device and the roadside wireless communication device can reliably perform communication without interruption.

12 Claims, 10 Drawing Sheets

| MAC FRAME HEADER FIELD (711) | SEQUENCE INDICATION FIELD (712) | ADDRESS INDICATION FIELD (713) | SYNCH PARAMETER FIELD (721) | INFORMATION INDICATION FIELD | ... | INFORMATION INDICATION FIELD | CHECK SEQUENCE INDICATION FIELD (731) |
|---|---|---|---|---|---|---|---|
| MAC HEADER SECTION (710) | | | | FRAME BODY SECTION (720) | | | FRAME CHECK SEQUENCE (FCS) SECTION (730) |

722

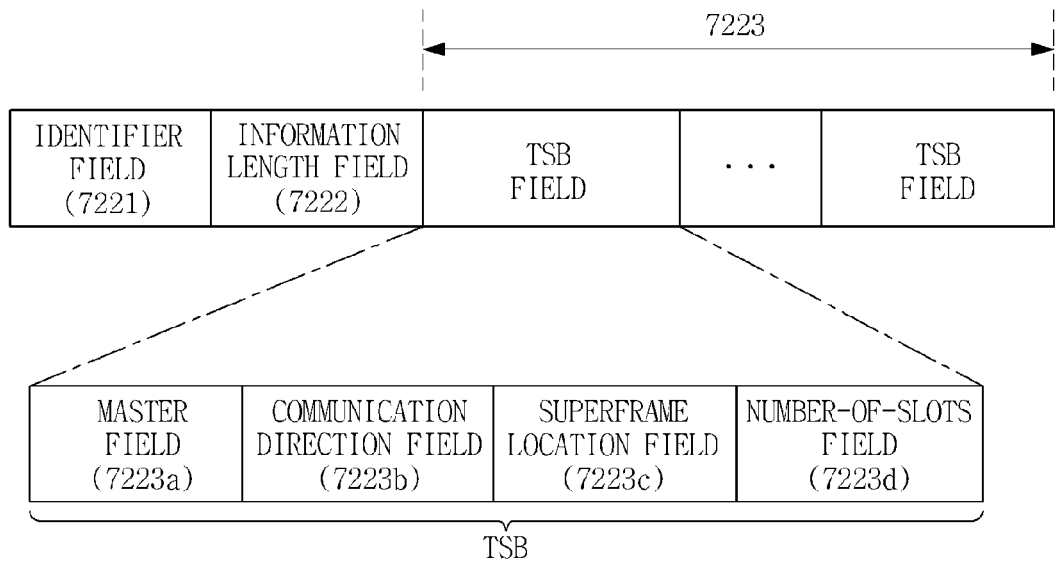

| MAC FRAME HEADER FIELD (811) | SEQUENCE INDICATION FIELD (812) | ADDRESS INDICATION FIELD (813) | ... | COMMUNICATION DIRECTION INDICATION FIELD (821) | NUMBER-OF -SLOTS INDICATION FIELD (822) | PRIORITY INDICATION FIELD (823) | PERFORMANCE INDICATION FIELD (824) | ... | FCS |
|---|---|---|---|---|---|---|---|---|---|
| MAC HEADER SECTION (810) | | | | FRAME BODY SECTION (820) | | | | | FCS (830) |

METHOD OF PROVIDING WIRELESS COMMUNICATION BETWEEN VEHICLE AND ROADSIDE AND VEHICLE WIRELESS COMMUNICATION DEVICE USING THE SAME

CROSS REFERENCE TO RELATED APPLICATIONS

This application claims the benefit of Korean Patent Application Nos. 10-2010-0132873 filed on Dec. 22, 2010 and 10-2011-0045367 filed on May 13, 2011, which are hereby incorporated by reference in their entirety into this application.

BACKGROUND OF THE INVENTION

1. Technical Field

The present invention relates generally to a method of providing wireless communication between a vehicle and a roadside and a vehicle wireless communication device using the method and, more particularly, to a method of providing wireless communication between a vehicle and a roadside and a vehicle wireless communication device using the method, which can provide services at the high success rate of wireless communication without causing interruption in communication between the devices on the vehicle and the roadside in a vehicle traveling environment.

2. Description of the Related Art

Recently, concern about intelligent and safe vehicles has gradually increased. For example, there has been increased concern about schemes in which various sensors installed on the roadside and a server system work in conjunction with each other to improve safety as the vehicles travel or to enable unmanned driving.

These technologies are implemented using wireless communication between devices installed on a vehicle and the roadside. For this, communication must be performed within a preset period of time, a high success rate of communication must be maintained, and uninterrupted communication services must be provided in a vehicle traveling environment.

In order to satisfy these requirements, devices installed on the vehicle and the roadside must support Dedicated Short Range Communication (DSRC), Wireless Access Vehicle Environment (WAVE) communication, Wireless Broadband Internet (WiBro) communication, Wireless Fidelity (WiFi) communication, or the like.

However, DSRC employs a slotted Aloha-type media access control scheme, and is centered around hot spot communication that avoids contention between wireless communication devices by allocating the right to access a medium, thus causing the problem of uninterrupted communication based on the traveling of the vehicle not being taken into consideration.

WAVE communication is a technology that enables wireless communication to be performed in the high-speed traveling environment of vehicles that could not be supported by conventional Institute of Electrical and Electronics Engineers (IEEE) 802.11. However, this is also problematic in that Carrier Sense Multiple Access with Collision Avoidance (CSMA/CA)-type media access control is used, and thus communication within a fixed delay time cannot be guaranteed.

Further, Wibro communication is problematic in that a communication device at a remove place and the control of a server are required so as to perform wireless communication between devices on the vehicle and the roadside in the same region via wireless communication service provided by a common carrier, thus exhibiting the characteristic of a relatively high communication delay. Furthermore, WiFi communication is not suitable for the vehicle traveling environment because of the long hand-over time and the long initialization time.

Therefore, there is required technology for avoiding communication collisions between devices installed on the vehicle and the roadside and allowing the devices on the vehicle and the roadside to reliably perform communication in a vehicle traveling environment.

SUMMARY OF THE INVENTION

Accordingly, the present invention has been made keeping in mind the above problems occurring in the prior art, and an object of the present invention is to provide a method of providing highly reliable wireless communication between a vehicle and a roadside in uninterrupted extended delay time between devices on the vehicle and the roadside in a vehicle traveling environment, and a vehicle wireless communication device using the method.

In accordance with an aspect of the present invention to accomplish the above object, there is provided a method of providing vehicle wireless communication, including a vehicle receiving hand-over-related link information, which includes slot request information about slots requested by the vehicle to a roadside wireless communication device for hand-over of the vehicle, from a central control server; sending a hand-over preparation message, which includes the hand-over-related link information, to a vehicle wireless communication device connected to the vehicle; determining that the vehicle completed preparation for performance of the hand-over when a response message to the hand-over preparation message is received from the vehicle wireless communication device; allocating slots in consideration of the hand-over-related link information; and transmitting beacon frames, which include slot allocation information about the allocated slots, to the vehicle wireless communication device.

Preferably, the method may further include sending to the central control server a hand-over preparation completion message indicating that preparation for hand-over has been completed; and receiving from the central control server a hand-over performance command message required to perform hand-over as a response to the hand-over preparation completion message.

Preferably, the method may further include, performing slot defragmentation if successive time slots are not present when the vehicle wireless communication device requests allocation of the successive time slots; loading both current slot allocation information that existed before performance of the slot defragmentation, and subsequent slot allocation information changed after performance of the slot defragmentation onto the beacon frames, and transmitting resulting beacon frames; and replacing the current slot allocation information with the subsequent slot allocation information after transmitting a predetermined number of beacon frames, and deleting the subsequent slot allocation information from the beacon frames.

Preferably, each of the beacon frames may be individually included in at least two superframes.

Preferably, each of the at least two superframes may include a beacon frame period, a contention access period, a contention-free multicasting period, and a contention-free unicasting period.

Preferably, the beacon frame period may include a Media Access Control (MAC) header section for indicating sequence and address information of a MAC frame; and a frame body section for indicating a WNC synchronization parameter and information elements provided by the beacon frame.

Preferably, the frame body section may include a synchronization parameter indication field for indicating the WNC synchronization parameter; and information indication fields for indicating the information elements provided by the beacon frame.

Preferably, the synchronization parameter indication field may include a time token field for indicating time synchronization; an omni-frame length field for indicating length of an omni-frame; a beacon period length field for indicating length of the beacon frame period; a contention period length field for indicating length of the contention access period; a contention-free unicasting length field for indicating length of the contention-free unicasting period; and a contention-free multicasting length field for indicating length of the contention-free multicasting period.

Preferably, the information indication fields may include an identifier field for indicating an identifier of the slot allocation information; an information length field for indicating total length of the slot allocation information; and at least one TSB section.

Preferably, the at least one TSB section may include a master field for indicating a master of the slot allocation information; a communication direction field for indicting a communication direction including uplink unicasting, downlink unicasting, and multicasting; a superframe location field for indicating locations of slots in the superframe; and a number-of-slots field for indicating a number of slots.

In accordance with another aspect of the present invention to accomplish the above object, there is provided a method of providing vehicle wireless communication, including receiving first beacon frames from a plurality of roadside wireless communication devices during beacon periods of at least two superframes included in a first omni-frame period; selecting at least one roadside wireless communication device from among the plurality of roadside wireless communication devices transmitted the first beacon frames; sending an association request message, which includes slot request information about slots desired to be requested from the at least one roadside wireless communication device, during contention access periods of the at least two superframes; and receiving second beacon frames, which include slot allocation information allocated based on the slot request information from the relevant roadside wireless communication device that received the association request message, during a second omni-frame period subsequent to the first omni-frame period.

Preferably, a frame of the association request message may include a Media Access Control (MAC) header section for indicating sequence and address information of a MAC frame; and a frame body section for indicating the slot request information.

Preferably, the slot request information may include a contention-free period requested by the vehicle wireless communication device, a number of the slots, priority, and performance indication information of the vehicle wireless communication device.

Preferably, the frame body section may include a communication direction indication field for indicating a contention-free period of the slots, a number-of-slots indication field for indicting a number of the slots, a priority indication field for indicting priority, and a performance indication field.

Preferably, the receiving the second beacon frames during the second omni-frame period may include allocating a number of slots which are equal to or less than the number of slots of the contention-free period.

Preferably, the contention-free period may include a contention-free multicasting period and a contention-free unicasting period.

In accordance with a further aspect of the present invention to accomplish the above object, there is provided a vehicle wireless communication device, including a frame reception unit for receiving first beacon frames, which are respectively included in at least two superframes included in a first omni-frame period, from a plurality of roadside wireless communication devices; an association request unit for selecting at least one roadside wireless communication device from among the plurality of roadside wireless communication devices, which transmitted the first beacon frames, and sending an association request message, which includes slot request information about slots requested to the at least one roadside wireless communication device during contention access periods of the at least two superframes; and a frame processing unit for receiving second beacon frames, which include slot allocation information allocated based on the slot request information, during a second omni-frame period subsequent to the first omni-frame period.

BRIEF DESCRIPTION OF THE DRAWINGS

The above and other objects, features and advantages of the present invention will be more clearly understood from the following detailed description taken in conjunction with the accompanying drawings, in which:

FIG. 3 is a diagram schematically showing the structure of a beacon frame for managing information about the superframe of FIG. 2;

FIG. 4 is a diagram schematically showing the structure of the synchronous parameter indication field of the beacon frame of FIG. 3;

FIG. 5 is a diagram schematically showing the structure of the information indication field of the beacon frame of FIG. 3;

FIG. 8 is a diagram schematically showing the structure of the frame of an association request message transmitted/received when being associated with the vehicle wireless communication provision system of FIG. 7;

DESCRIPTION OF THE PREFERRED EMBODIMENTS

Figure 1:
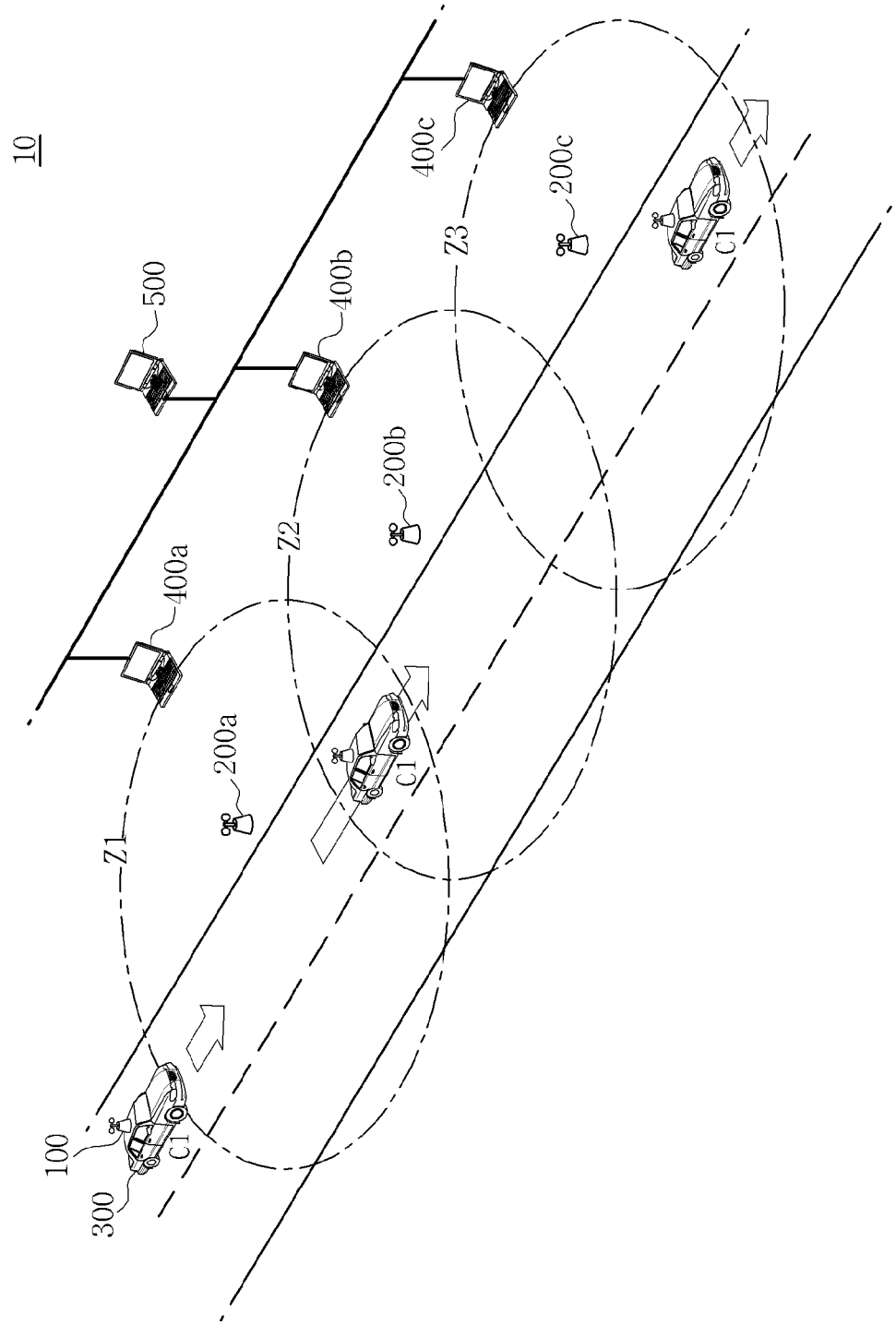
FIG. 1 is a diagram schematically showing a system for providing vehicle wireless communication according to an embodiment of the present invention.

Reference now should be made to the drawings, in which the same reference numerals are used throughout the different drawings to designate the same or similar components.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

FIG. 1 is a diagram schematically showing a system for providing vehicle wireless communication according to an embodiment of the present invention.

As shown in FIG. 1, a system 10 for providing vehicle wireless communication between devices on a vehicle and a roadside according to an embodiment of the present invention includes a vehicle wireless communication device 100, roadside wireless communication devices 200a to 200c, a vehicle controller 300, roadside local servers 400a to 400c, and a central control server 500.

The roadside local server 400a and the roadside wireless communication device 200a are included in a first area Z1 formed in a direction in which a vehicle travels. The roadside local server 400b and the roadside wireless communication device 200b are included in a second area Z2 adjacent to the first area Z1. The roadside local server 400c and the roadside wireless communication device 200c are included in a third area Z3 adjacent to the second area Z2.

In this case, the roadside wireless communication devices 200a to 200c and the roadside local servers 400a to 400c are individually connected to one another in a wired manner. Further, the vehicle wireless communication device 100 and the vehicle controller 300 are connected to each other in a wired manner and are then mounted on a vehicle C1.

The roadside local servers 400a to 400c transmit or receive vehicle control information required to control the vehicle to or from the vehicle controller 300 via the vehicle wireless communication device 100. The vehicle control information according to the embodiment of the present invention may include steering, brake and velocity information required to directly control the vehicle, obstacle information, local vehicle path information, etc. The roadside local servers individually communicate with other roadside local servers and the central control server 500 in a wired manner.

Figure 2:
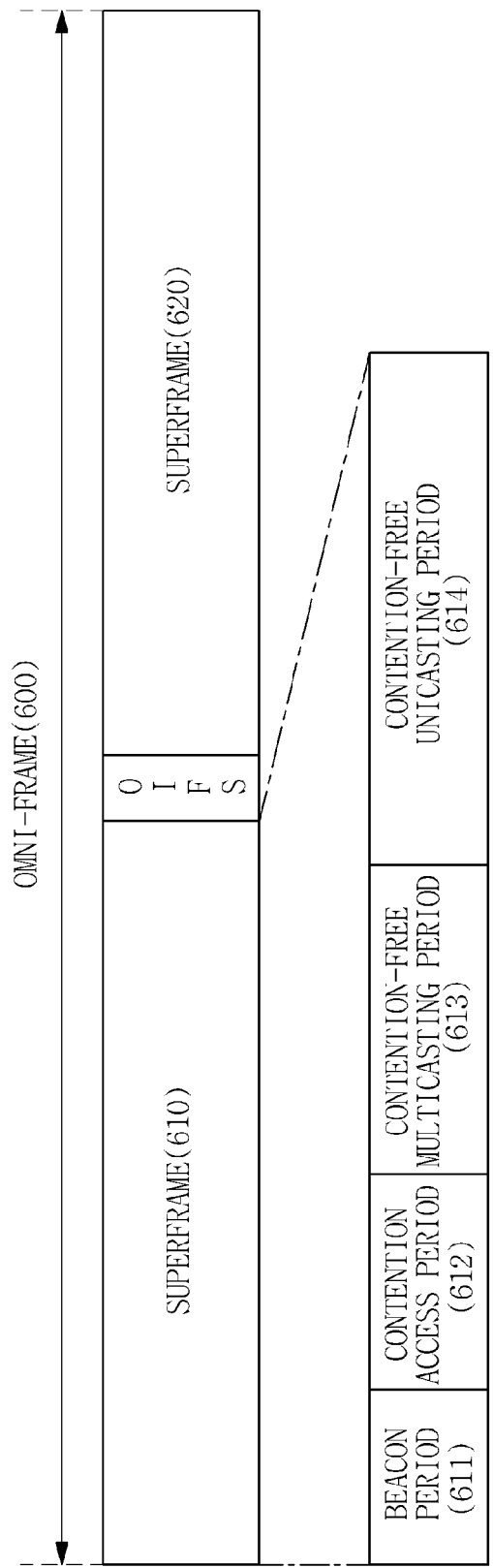
FIG. 2 is a diagram schematically showing the structure of a frame transmitted/received in the vehicle wireless communication provision system of FIG. 1.

FIG. 2 is a diagram schematically showing the structure of a frame used in the vehicle wireless communication provision system of FIG. 1.

As shown in FIG. 2, an omni-frame 600 used in the vehicle wireless communication provision system 10 according to an embodiment of the present invention has a structure in which wireless communication service between a vehicle device and a roadside device support multicasting without causing interruption.

The omni-frame 600 includes at least one superframe. The length of the omni-frame 600 is equal to or less than the maximum transfer delay time required by communication devices. Here, such a superframe is not duplicatively used between roadside wireless communication devices adjacent to each other, so that superframes are prevented from colliding with each other, thus preventing the service that is performing wireless communication with the vehicle from being interrupted. In the embodiment of the present invention, it is assumed that two superframes 610 and 620 constitute the omni-frame for the sake of description. Since the individual superframes have the same structure, the structure thereof will be described in detail using the superframe 610.

The superframe 610 is formed to be spaced apart from the adjacent superframe 620 by an Observation Inter-Frame Space (OIFS). The superframe 610 includes information required to allocate times for data transmission to respective communication devices in a Time Division Multiple Access (TDMA) Media Access Control (MAC) scheme.

In detail, the superframe 610 is composed of slots which are basic units, and is divided into periods, each composed of a plurality of slots having the same purpose. The superframe 610 includes a beacon period 611, a Contention Access Period (CAP) 612, a contention-free multicasting period (MCP period) 613, and a contention-free unicasting period (UCP period) 614.

The beacon period 611 is a period during which a beacon frame which is the start reference frame of the superframe is transmitted. Here, the beacon frame is periodically broadcasted by the roadside wireless communication devices 200a to 200c, and the vehicle wireless communication device 100 that receives the beacon frame makes time synchronization with the roadside wireless communication devices 200a to 200c.

The contention access period 612 is a period during which packet exchange is freely performed within a limited communication delay time, and a medium can be accessed using a contention scheme such as a Carrier Sense Multiple Access/Collision Avoidance (CSMA/CA) scheme.

The contention-free multicasting period 613 is a period during which time is allocated to perform multicasting. That is, when multicasting is required, the roadside wireless communication device is allocated a required time slot of the contention-free multicasting period 613, and transmits its data by multicasting the data in the allocated time slot. The time allocation information for multicasting is defined in the beacon frame.

The contention-free unicasting period 614 is a period during which time is allocated to perform unicasting. That is, when unicasting is required, the vehicle wireless communication device is allocated a required time slot of the contention-free unicasting period, and transmits its data by unicasting the data in the allocated time slot. Here, the time allocation information for unicasting is defined in the beacon frame.

FIG. 3 is a diagram schematically showing the structure of a beacon frame for managing information about the superframe of FIG. 2.

As shown in FIG. 3, a beacon frame 700 for managing information about the superframe 610 according to an embodiment of the present invention includes a MAC header section 710, a frame body section 720, and a Frame Check Sequence (FCS) section 730.

The MAC header section 710 includes a MAC frame header field 711 for indicating a MAC frame header, a sequence indication field 712 for indicating the sequence index of the frame, and an address indication field 713 for indicating address information.

The frame body section 720 includes a synch parameter indication field 721 for indicating a Wireless Network Communication (WNC) synchronization (synch) parameter, and information indication fields 722 for indicating a plurality of information elements. Here, the sync parameter indication field 721 includes the structure information of the omni-frame 600 and the superframe 610 and time token information for time synchronization thereof.

As shown in FIG. 4, the synch parameter indication field 721 includes a time token field 7211 for indicating time synchronization, an omni-frame length field 7212 for indicating the length of the omni-frame, a beacon period length field 7213 for indicating the length of the beacon period, a contention period length field 7214 for indicating the length of a contention access period, a contention-free multicasting length field 7215 for indicating the length of a contention-free multicasting period, and a contention-free unicasting length field 7216 for indicating the length of a contention-free unicasting period.

Referring back to FIG. 3, the information indication fields 722 define information elements used in the beacon frame 700. The information elements according to the embodiment of the present invention are defined as slot allocation information, which indicates information about a time slot allocated to a communication device which requested contention-free media access control. As shown in FIG. 5, the information indication fields 722 include an identifier field 722 for indicating the identifier of each information element, an information length field 7222 for indicting the total length of the slot allocation information, and at least one Time Slot Block (TSB) section 7223.

The TSB section 7223 includes a master field 7223a, a communication direction field 7223b, a superframe location field 7223c, and a number-of-slots field 7223d.

The master field 7223a indicates the master of an allocated slot.

The communication direction field 7223b indicates the communication direction such as in uplink unicasting, downlink unicasting, and multicasting. For example, when uplink unicasting or downlink unicasting is indicated in the communication direction field 7223b, a relevant slot is analyzed as being located in a contention-free unicasting period. When multicasting is indicated in the communication direction section 7223b, a relevant slot is analyzed as being located in a contention-free multicasting period.

The superframe location field 7223c indicates the location of the slot in the superframe. Here, the location of the slot is denotes the location relative to the start point of the period (a contention-free multicasting period or a contention-free unicasting period) in which a relevant time slot is included, and the location of the slot is defined by a communication direction period.

The number-of-slots field 7223d indicates the number of time slots.

The Frame Check Sequence (FCS) section 730 includes a check sequence indication field 731 for detecting the error of a frame using information about parity or Cyclic Redundancy Check (CRC) and indicating the detected error.

Figure 6:
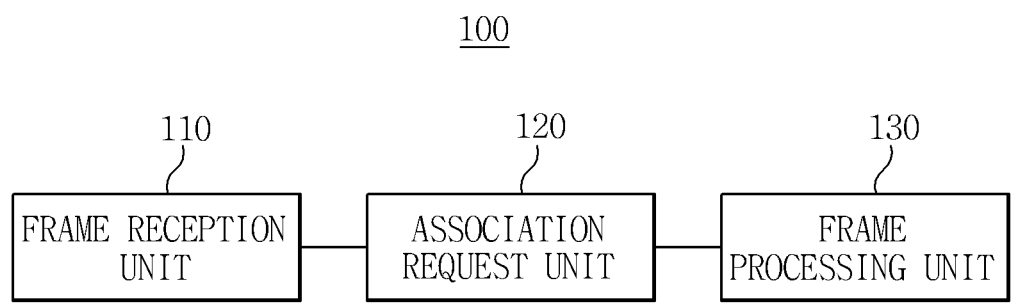
FIG. 6 is a diagram schematically showing the vehicle wireless communication device of FIG. 1.

FIG. 6 is a diagram schematically showing the vehicle wireless communication device of FIG. 1.

As shown in FIG. 6, the vehicle wireless communication device 100 according to an embodiment of the present invention includes a frame reception unit 110, an association request unit 120, and a frame processing unit 130.

The frame reception unit 110 performs passive scanning so as to participate in a network that performs media access control in a TDMA manner. Further, the frame reception unit 110 is provided with all unique beacon frames that have been received when a receiver is activated for a predetermined period of time.

The association request unit 120 selects at least one roadside wireless communication device from among relevant roadside wireless communication devices which transmitted beacon frames during a first omni-frame period including at least two superframes. The association request unit 120 generates an association request message including slot request information about a slot which is desired to be requested from the at least one roadside wireless communication device, and sends the association request message to the roadside wireless communication device during the contention access periods of at least two superframes.

The frame processing unit 130 receives a beacon frame, which is generated by the roadside wireless communication device using the association request message, during a subsequent second omni-frame period. When the beacon frame is received during the second omni-frame period, the frame processing unit 130 notifies the vehicle controller 300 that association has been approved by sending an association notification message to the vehicle controller 300.

Figure 7:
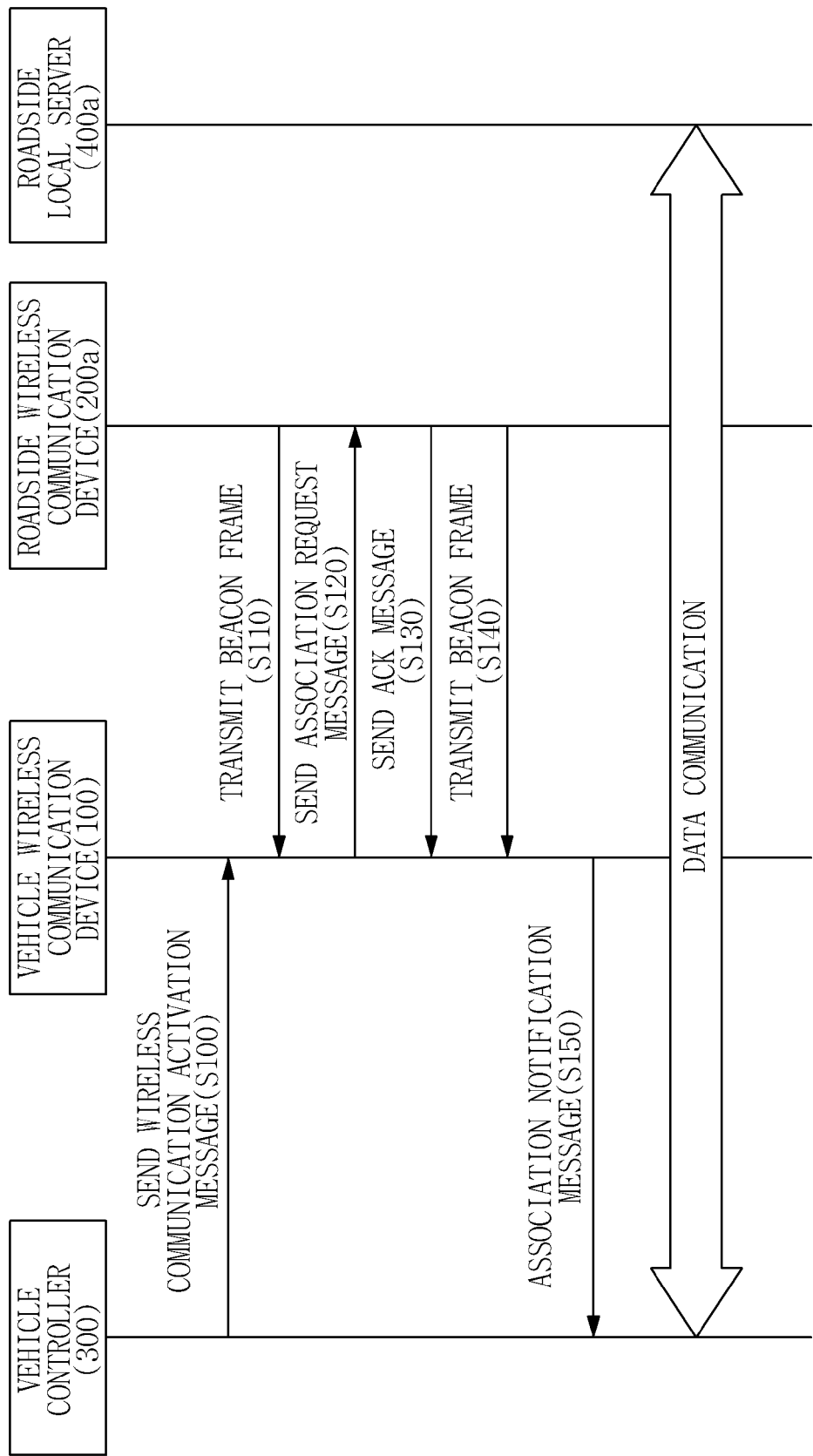
FIG. 7 is a diagram showing a procedure in which the vehicle of FIG. 1 is associated with the system for providing vehicle wireless communication.

FIG. 7 is a diagram showing a procedure in which the vehicle of FIG. 1 is associated with the vehicle wireless communication provision system.

Referring to FIGS. 1 and 7, the vehicle controller 300 according to an embodiment of the present invention sends a wireless communication activation message to the vehicle wireless communication device 100 connected to the vehicle controller 300 at step S100.

The vehicle wireless communication device 100 performs passive scanning so as to participate in a network which performs media access control in a TDMA manner. Further, after changing each logical channel, the vehicle wireless communication device 100 records information about all unique beacon frames received when the receiver is activated for a predetermined period of time at step S110. Here, passive scanning denotes an operation in which the vehicle wireless communication device 100 detects relevant roadside wireless communication devices, which transmit beacon frames, within the range of the operation.

The vehicle wireless communication device 100 selects at least one roadside wireless communication device 200a from among the relevant roadside wireless communication devices which transmitted the beacon frames. Further, the vehicle wireless communication device 100 sends an association request message to the roadside wireless communication device 200a during a contention access period at step S120. In this case, the vehicle wireless communication device 100 can analyze the structure of the superframe of the selected roadside wireless communication device 200a and the location of the contention access period by using the beacon frame.

When the association request message is received, the roadside wireless communication device 200a permits the association of the vehicle wireless communication device 100, generates an affirmative response message (Acknowledgement: ACK) for permitting the association of the vehicle wireless communication device 100, and sends ACK to the vehicle wireless communication device 100 at step S130.

Further, the roadside wireless communication device 200a allocates a number of slots which are equal to or less than the number of slots of the contention access period that are requested by the association request message, and generates slot allocation information including information about the allocated slots. The roadside wireless communication device 200a applies a beacon frame including the slot allocation information to a subsequent omni-frame, and transmits a resulting omni-frame to the vehicle wireless communication device 100 at step S140. In this case, when there are not enough network resources in the slot allocation procedure, a number of slots less than the number of slots requested by the association request message can be successively allocated.

The vehicle wireless communication device 100 generates an association notification message indicting that association has been permitted, and notifies the vehicle controller 300 that association has been permitted by sending the association notification message to the vehicle controller 300 at step S150. In this case, when there is a need to change the allocated slots, the vehicle wireless communication device 100 may request the associated roadside wireless communication device 200*a* to change the allocated slots.

Meanwhile, when the priority of another vehicle wireless communication device that is newly associated is higher than that of the previously associated vehicle wireless communication device, the roadside wireless communication device 200*a* may retrieve the time slot that was allocated to the previously associated vehicle wireless communication device, and may allocate the retrieved time slot to the newly associated vehicle wireless communication device 100.

FIG. 8 is a diagram schematically showing the structure of the frame of an association request message transmitted/received when being associated with the vehicle wireless communication provision system of FIG. 7.

As shown in FIG. 8, the frame 800 of the association request message according to an embodiment of the present invention includes a MAC header section 810, a frame body section 820, and a Frame Check Sequence (FCS) section 830.

The MAC header section 810 includes a MAC frame header field 811 for indicating a MAC frame header, a sequence indication field 812 for indicating the sequence index of the frame, and an address indication field 813 for indicating address information.

The frame body section 820 includes a communication direction indication field 821, a number-of-slots indication field 822, a priority indication field 823, and a performance indication field 824, and indicates slot request information.

The communication direction indication field 821 indicates the period of time slots requested by an association request message, for example, a contention-free multicasting period or a contention-free unicasting period.

The number-of-slots indication field 822 indicates the number of time slots requested by the association request message.

The priority indication field 823 indicates priority requested by the association request message.

The performance indication field 824 indicates the performance of a communication device which requests association using the association request message.

The FCS section 830 is a section in which the error of the frame is detected using information about parity or Cyclic Redundancy Check (CRC).

Figure 9:
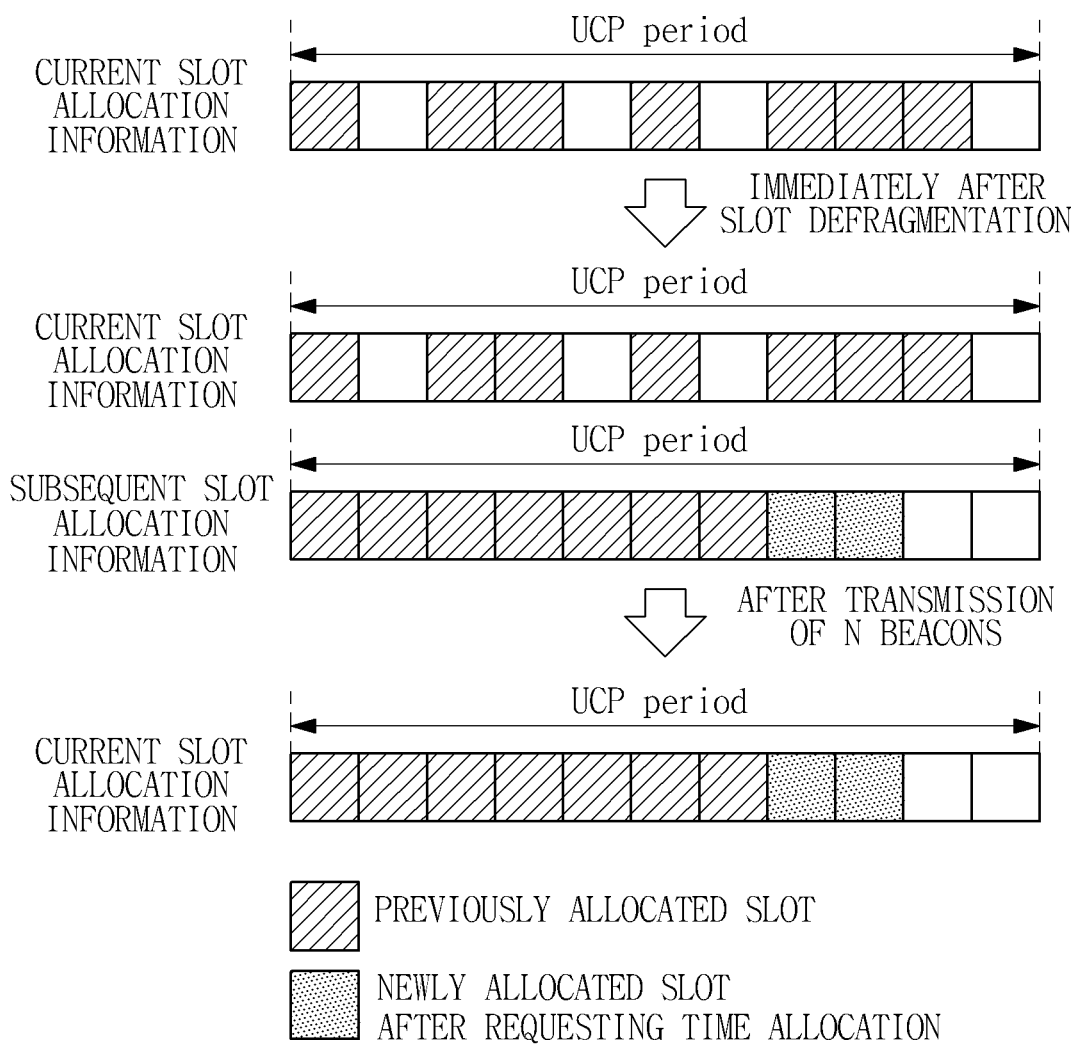
FIG. 9 is a diagram showing an example in which the roadside wireless communication device of FIG. 1 performs a slot allocation information notification procedure based on slot defragmentation.

FIG. 9 is a diagram showing an example in which the roadside wireless communication device of FIG. 1 performs a slot allocation information notification procedure based on slot defragmentation.

Referring to FIGS. 1 and 9, as the vehicle wireless communication device 100 according to the embodiment of the present invention is associated with and released from the roadside wireless communication device, the leakage of wireless resources during a contention-free multicasting period or a contention-free unicasting period occurs. In this situation, when the vehicle wireless communication device 100 requests the allocation of successive time slots, there may occur the case where the total number of slots of a contention-free period is greater than the number of slots requested by the vehicle wireless communication device 100, but the requested slots are dispersed and then it is impossible to allocate slots. In order to solve this problem, the roadside wireless communication device 200*a* performs slot defragmentation.

The roadside wireless communication device 200*a* starts to perform slot defragmentation when the total number of slots of the contention-free multicasting period or the contention-free unicasting period is greater than the number of slots requested by the vehicle wireless communication device, but the slots are dispersed and then it is impossible to allocate requested slots.

First, the roadside wireless communication device 200*a* collects slot fragments and then generates new subsequent slot allocation information. That is, the roadside wireless communication device 200*a* completes slot defragmentation, indicates the current slot allocation information in the information indication field 722 of the beacon frames, and additionally inserts subsequent slot allocation information which has changed after the performance of slot defragmentation. In this case, the current slot allocation information denotes slot allocation information that existed before the performance of slot defragmentation. The roadside wireless communication device 200*a* replaces the current slot allocation information with the subsequent slot allocation information after n (0, 1, 2, . . . ) beacon frames have been transmitted. Further, the roadside wireless communication device 200*a* deletes the subsequent slot allocation information from the information indication field 722. That is, the beacon frames according to the embodiment of the present invention include slot allocation information that has the subsequent slot allocation information, instead of the current slot allocation information, after slot defragmentation has been completed.

In an embodiment of the present invention, the reason for additionally including the subsequent slot allocation information in the beacon frames or for performing network management based on the current slot allocation information that existed before slot defragmentation, until n beacon frames are transmitted after the slot defragmentation has been performed, is to minimize the failure of collision control attributable to the loss of beacon frames that may occur when the reception of beacon frames in an instable wireless communication environment fails.

That is, in consideration of the short length of the omniframe 600, when beacon loss occurs a predetermined number of times (for example, once or twice), it is assumed that a sudden change in slot allocation information is not present, and wireless resources are accessed based on the existing slot allocation information. However, after slot defragmentation has been performed, a sudden change in slot allocation information occurs, and then a serious communication problem may occur if the vehicle wireless communication device 100 accesses wireless resources based on the existing slot allocation information.

Therefore, while transmitting n beacon frames after the performance of slot defragmentation, the roadside wireless communication device loads both the current slot allocation information that existed before the performance of slot defragmentation and the subsequent slot allocation information that has changed after the performance of slot defragmentation, onto the beacon frames, and transmits the resulting beacon frames. Accordingly, the vehicle wireless communication device 100 accesses wireless resources using the current slot allocation information that existed before the performance of slot defragmentation, and delays the application of new subsequent slot allocation information while n beacon frames are being transmitted.

While n beacon frames are being transmitted from the roadside wireless communication device after the performance of slot defragmentation, the vehicle communication devices which are associated with the roadside wireless communication devices set a value of n so that all of subsequent slot allocation information can be received. The vehicle wireless communication device 100 additionally receives new subsequent slot allocation information while the n beacon frames are being transmitted from the roadside wireless communication device, thus preparing for the change in the slot allocation information attributable to slot defragmentation. In beacon frames that are transmitted after the n beacon frames, the subsequent slot allocation information of the existing beacon frames replaces the current slot allocation information, and the subsequent slot allocation information is deleted from the beacon frames.

Figure 10:
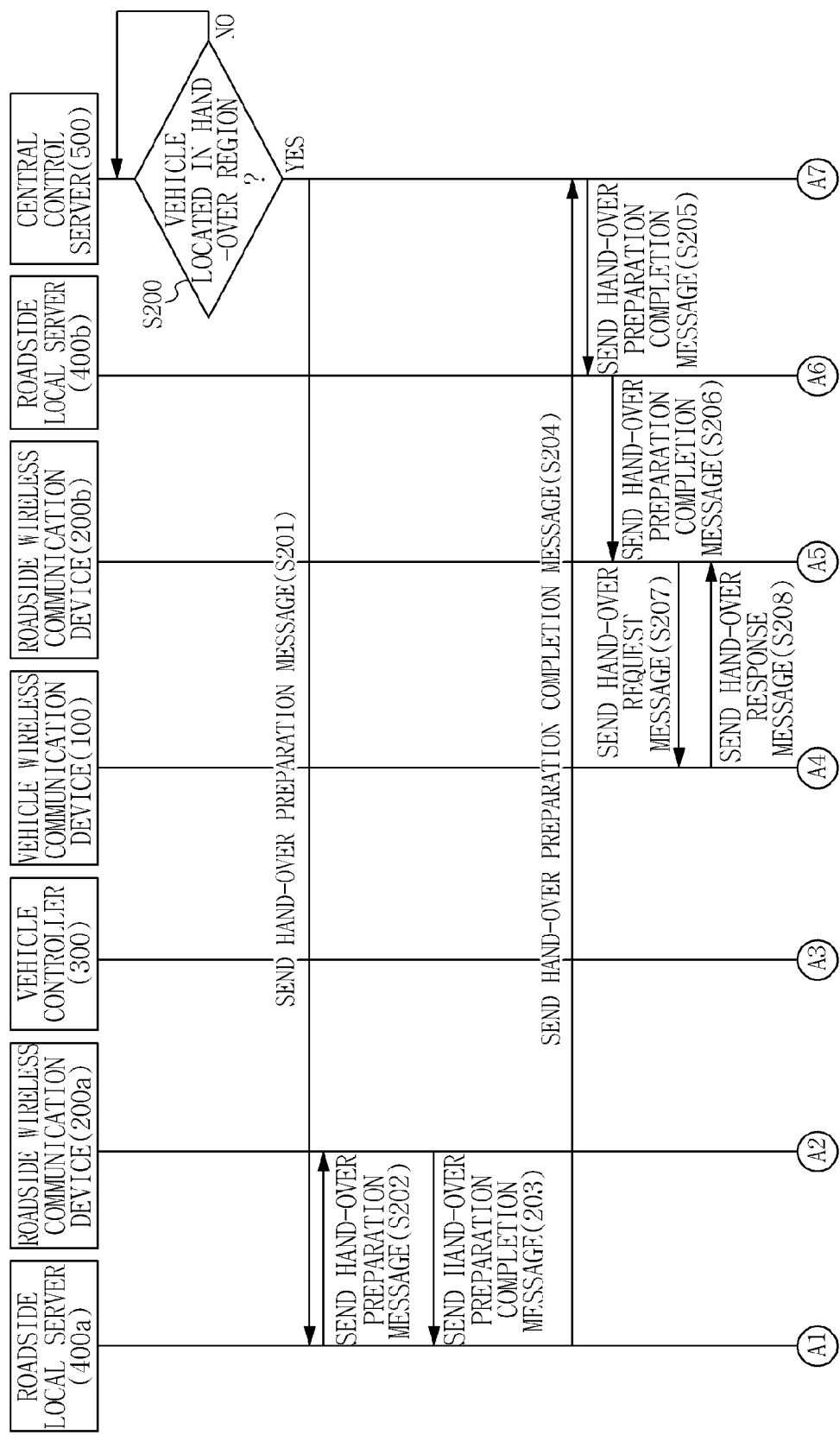
FIGS. 10 and 11 are flowcharts showing the sequence of hand-over performed by the vehicle wireless communication provision system of FIG. 1
Figure 11:
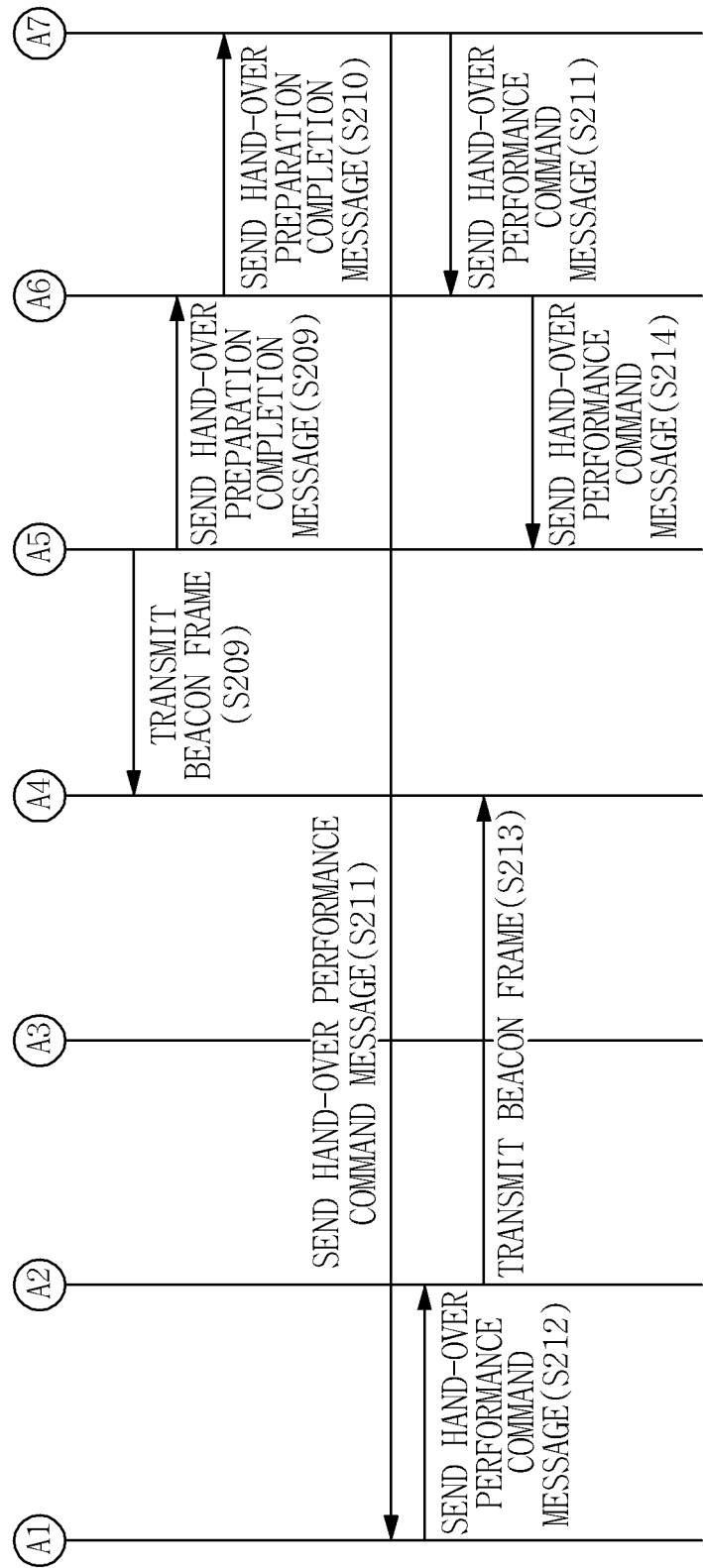

FIGS. 10 and 11 are flowcharts showing the sequence of hand-over performed in the vehicle wireless communication provision system of FIG. 1. In FIGS. 9 and 10, a description will be made on the assumption that a vehicle C1 including a vehicle wireless communication device 100 and a vehicle controller 300a is moving from a first area Z1 to a second area Z2.

Referring to FIGS. 10 and 11, the central control server 500 of the vehicle wireless communication provision system 10 according to the embodiment of the present invention determines whether the vehicle C1 is located in a hand-over region between the first area Z1 and the second area Z2 at step S200. If it is determined at step S200 that the vehicle C1 is located in the hand-over region between the first area Z1 and the second area Z2, the central control server 500 sends a hand-over preparation message both to a roadside wireless communication device 200a and to a roadside local server 400a in the first area Z1 at step S201.

The roadside local server 400a sends a hand-over preparation message to the roadside wireless communication device 200a at step S202. The roadside wireless communication device 200a sends a hand-over preparation completion message to the roadside local server 400a when completing preparation for the permission of hand-over at step S203. In this case, the hand-over preparation completion message includes hand-over-related link information, which includes slot allocation information having information about allocated slots.

The roadside local server 400a sends the hand-over preparation completion message including the hand-over-related link information to the central control server 500 at step S204.

The central control server 500 sends the hand-over preparation completion message to a roadside local server 400b located in the second area Z2 which is the subsequent area in the travel path of the vehicle C1 at step S205. The roadside local server 400b sends the hand-over preparation completion message to a roadside wireless communication device 200b at step S206.

The roadside wireless communication device 200b sends a hand-over request message to the vehicle wireless communication device 100 of the vehicle C1 that requires hand-over at step S207. When hand-over is requested, the vehicle wireless communication device 100 generates a hand-over response message and sends it to the roadside wireless communication device 200b at step S208.

When the hand-over response message is received, the roadside wireless communication device 200b determines that the vehicle C1 completed preparation for the performance of hand-over, and sends a hand-over preparation completion message to the roadside local server 400b at step S209. Further, at step S209, the roadside wireless communication device 200b generates a beacon frame including the slot allocation information using the hand-over preparation completion message, and transmits the generated beacon frame to the vehicle wireless communication device 100.

When completing preparation for the permission of hand-over, the roadside local server 400b sends a hand-over preparation completion message to the central control server 500 at step S210.

The central control server 500 sends a hand-over performance command message both to the roadside local server 400a and to the roadside local server 400b at step S211.

Then, the roadside local server 400a sends the hand-over performance command message to the roadside wireless communication device 200a at step S212. The roadside wireless communication device 200a transmits the beacon frame, from which information about slots that were allocated to the vehicle wireless communication device 100 has been deleted, to the vehicle wireless communication device 100, thus enabling hand-over to be performed at step S213. At the same time, the roadside local server 400b sends the hand-over performance command message to the roadside wireless communication device 200b at step S214. That is, the vehicle wireless communication device 100 receives the beacon frame, from which the information about the slots allocated by the roadside wireless communication device 200a of the first area Z1 has been deleted, and also receives a beacon frame which includes information about slots newly allocated by the roadside wireless communication device 200b of the second area Z2, thus performing hand-over in the extended delay time without causing interruption.

As described above, the roadside wireless communication device according to an embodiment of the present invention performs hand-over by allocating slots in consideration of slot information requested by a vehicle wireless communication device and transmitting beacon frames including allocated slot information to the vehicle wireless communication device, thus preventing communication collisions from occurring. Further, the present invention enables the vehicle wireless communication device and the roadside wireless communication device to reliably perform communication without causing any interruption within a predictable amount of time required by the vehicle wireless communication device.

According to embodiments of the present invention, only the master of a contention-free slot can perform communication in the contention-free slot via a procedure in which a vehicle wireless communication device which desires to use wireless resources for communication requests the contention-free slot from a roadside communication device by making an association request and in which information about the contention-free slot allocated by the roadside communication device as a result of the association request is transmitted to the vehicle communication device with the contention-free slot information included in the beacon frame of the roadside communication device. Accordingly, the present invention enables a vehicle wireless communication device and a roadside wireless communication device to perform stable communication within a predictable amount of time required by the vehicle wireless communication device, compared to contention-based wireless communication. Furthermore, the present invention can perform hand-over based on cooperation between a central control server, a roadside server, and communication devices, thus enabling communication to be performed without causing interruption.

As described above, optimal embodiments of the present invention have been disclosed in the drawings and the present specification. In this case, although specific terms have been used, those terms are merely intended to describe the present invention and are not intended to limit the meanings and the scope of the present invention as disclosed in the accompanying claims. Therefore, those skilled in the art will appreciate that various modifications and other equivalent embodiments are also possible given the above description. Therefore, the technical scope of the present invention should be defined by the technical spirit of the accompanying claims.

What is claimed is:

1. A method of providing vehicle wireless communication, comprising:
    receiving hand-over-related link information which includes slot request information about slots requested by a vehicle from a roadside wireless communication device for hand-over of the vehicle, from a central control server;
    sending a hand-over preparation message, which includes the hand-over-related link information, to a vehicle wireless communication device connected to the vehicle;
    determining that the vehicle completed preparation for performance of the hand-over when a response message to the hand-over preparation message is received from the vehicle wireless communication device,
    allocating slots in consideration of the hand-over-related link information; and
    transmitting beacon frames, which include slot allocation information about the allocated slots, to the vehicle wireless communication device;
    wherein each of the beacon frames is individually included in at least two superframes;
    wherein each of the at least two superframes comprises a beacon frame period, a contention access period, a contention-free multicasting period, and a contention-free unicasting period;
    wherein the beacon frame period comprises:
    a Media Access Control (MAC) header section for indicating sequence and address information of a MAC frame; and
    a frame body section for indicating a Wireless Network Communication (WNC) synchronization parameter and information elements provided by the beacon frame;
    wherein the frame body section comprises:
    a synchronization parameter indication field for indicating the WNC synchronization parameter; and
    information indication fields for indicating the information elements provided by the beacon frame;
    wherein the synchronization parameter indication field comprises:
    a time token field for indicating time synchronization;
    an omni-frame length field for indicating length of an omni-frame;
    a beacon period length field for indicating length of the beacon frame period;
    a contention period length field for indicating length of the contention access period;
    a contention-free unicasting length field for indicating length of the contention-free unicasting period; and
    a contention-free multicasting length field for indicating length of the contention-free multicasting period.

2. The method of claim 1, further comprising:
    sending to the central control server a hand-over preparation completion message indicating that preparation for hand-over has been completed; and
    receiving from the central control server a hand-over performance command message required to perform hand-over as a response to the hand-over preparation completion message.

3. The method of claim 1, further comprising:
    performing slot defragmentation if successive time slots are not present when the vehicle wireless communication device requests allocation of the successive time slots;
    loading both current slot allocation information that existed before performance of the slot defragmentation, and subsequent slot allocation information changed after performance of the slot defragmentation onto the beacon frames, and transmitting resulting beacon frames; and
    replacing the current slot allocation information with the subsequent slot allocation information after transmitting a predetermined number of beacon frames, and deleting the subsequent slot allocation information from the beacon frames.

4. The method of claim 1, wherein the information indication fields comprise:
    an identifier field for indicating an identifier of the slot allocation information;
    an information length field for indicating total length of the slot allocation information; and
    at least one Time Slot Block (TSB) section.

5. The method of claim 1, wherein the at least one TSB section comprises:
    a master field for indicating a master of the slot allocation information;
    a communication direction field for indicting a communication direction including uplink unicasting, downlink unicasting, and multicasting;
    a superframe location field for indicating locations of slots in the superframe; and
    a number-of-slots field for indicating a number of slots.

6. A method of providing vehicle wireless communication, comprising:
    receiving first beacon frames from a plurality of roadside wireless communication devices during beacon periods of at least two superframes included in a first omni-frame period;
    selecting at least one roadside wireless communication device from among the plurality of roadside wireless communication devices that transmitted the first beacon frames;
    sending an association request message, which includes slot request information about slots desired to be requested from the at least one roadside wireless communication device, during contention access periods of the at least two superframes; and
    receiving second beacon frames, which include slot allocation information allocated based on the slot request information from the roadside wireless communication device that received the association request message, during a second omni-frame period subsequent to the first omni-frame period;
    wherein each of the beacon frames is individually included in at least two superframes;
    wherein each of the at least two superframes comprises a beacon frame period, a contention access period, a contention-free multicasting period, and a contention-free unicasting period;
    wherein the beacon frame period comprises:
    a Media Access Control (MAC) header section for indicating sequence and address information of a MAC frame; and
    a frame body section for indicating a Wireless Network Communication (WNC) synchronization parameter and information elements provided by the beacon frame;
    wherein the frame body section comprises:
    a synchronization parameter indication field for indicating the WNC synchronization parameter; and
    information indication fields for indicating the information elements provided by the beacon frame;

wherein the synchronization parameter indication field comprises:

a time token field for indicating time synchronization;

an omni-frame length field for indicating length of an omni-frame;

a beacon period length field for indicating length of the beacon frame period;

a contention period length field for indicating length of the contention access period;

a contention-free unicasting length field for indicating length of the contention-free unicasting period; and a contention-free multicasting length field for indicating length of the contention-free multicasting period.

7. The method of claim 6, wherein a frame of the association request message comprises:

a Media Access Control (MAC) header section for indicating sequence and address information of a MAC frame; and a frame body section for indicating the slot request information.

8. The method of claim 7, wherein the slot request information comprises a contention-free period requested by the vehicle wireless communication device, a number of the slots, priority, and performance indication information of the vehicle wireless communication device.

9. The method of claim 7, wherein the frame body section comprises a communication direction indication field for indicating a contention-free period of the slots, a number-of-slots indication field for indicting a number of the slots, a priority indication field for indicting priority, and a performance indication field.

10. The method of claim 9, wherein the receiving the second beacon frames during the second omni-frame period comprises allocating a number of slots which are equal to or less than the number of slots of a contention access period that are requested.

11. The method of claim 10, wherein the contention-free period comprises a contention-free multicasting period and a contention-free unicasting period.

12. A vehicle wireless communication device, comprising:

a frame reception unit for receiving first beacon frames, which are respectively included in at least two superframes included in a first omni-frame period, from a plurality of roadside wireless communication devices;

an association request unit for selecting at least one roadside wireless communication device from among the plurality of roadside wireless communication devices, which transmitted the first beacon frames, and sending an association request message, which includes slot request information about slots requested to the at least one roadside wireless communication device during contention access periods of the at least two superframes; and a frame processing unit for receiving second beacon frames, which include slot allocation information allocated based on the slot request information, during a second omni-frame period subsequent to the first omni-frame period;

wherein each of the beacon frames is individually included in at least two superframes;

wherein each of the at least two superframes comprises a beacon frame period, a contention access period, a contention-free multicasting period, and a contention-free unicasting period;

wherein the beacon frame period comprises:

a Media Access Control (MAC) header section for indicating sequence and address information of a MAC frame; and a frame body section for indicating a Wireless Network Communication (WNC) synchronization parameter and information elements provided by the beacon frame;

wherein the frame body section comprises:

a synchronization parameter indication field for indicating the WNC synchronization parameter; and information indication fields for indicating the information elements provided by the beacon frame;

wherein the synchronization parameter indication field comprises:

a time token field for indicating time synchronization;

an omni-frame length field for indicating length of an omni-frame;

a beacon period length field for indicating length of the beacon frame period;

a contention period length field for indicating length of the contention access period;

a contention-free unicasting length field for indicating length of the contention-free unicasting period; and a contention-free multicasting length field for indicating length of the contention-free multicasting period.

* * * * *